(12) United States Patent
Tagami et al.

(10) Patent No.: US 10,766,227 B2
(45) Date of Patent: Sep. 8, 2020

(54) METHOD OF MANUFACTURING CARBON NANOTUBE COMPOSITE AND LAMINATE

(71) Applicant: AISIN SEIKI KABUSHIKI KAISHA, Kariya-shi (JP)

(72) Inventors: Tomoya Tagami, Nagoya (JP); Gang Xie, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 223 days.

(21) Appl. No.: 15/945,162

(22) Filed: Apr. 4, 2018

(65) Prior Publication Data

US 2018/0290431 A1 Oct. 11, 2018

(30) Foreign Application Priority Data

Apr. 5, 2017 (JP) .................. 2017-075260

(51) Int. Cl.
| | |
|---|---|
| *B32B 5/14* | (2006.01) |
| *B32B 9/00* | (2006.01) |
| *B32B 15/04* | (2006.01) |
| *B32B 15/01* | (2006.01) |
| *C01B 32/168* | (2017.01) |
| *C01B 32/162* | (2017.01) |
| *B82Y 30/00* | (2011.01) |
| *B82Y 40/00* | (2011.01) |

(52) U.S. Cl.
CPC ............ *B32B 9/007* (2013.01); *B32B 15/015* (2013.01); *B32B 15/04* (2013.01); *C01B 32/162* (2017.08); *C01B 32/168* (2017.08); *B32B 2250/05* (2013.01); *B82Y 30/00* (2013.01); *B82Y 40/00* (2013.01); *Y10T 428/12458* (2015.01); *Y10T 428/12535* (2015.01)

(58) Field of Classification Search
None
See application file for complete search history.

(56) References Cited

U.S. PATENT DOCUMENTS

| 9,833,772 B2 | 12/2017 | Cola | |
|---|---|---|---|
| 2012/0301663 A1* | 11/2012 | Koike | B82Y 30/00 428/114 |
| 2015/0351285 A1* | 12/2015 | Noda | C01B 32/16 165/185 |

FOREIGN PATENT DOCUMENTS

JP 2015-530961 10/2015

* cited by examiner

*Primary Examiner* — Seth Dumbris
(74) *Attorney, Agent, or Firm* — Oblon, McClelland, Maier & Neustadt, L.L.P.

(57) ABSTRACT

A method of manufacturing a carbon nanotube composite includes: a laminate forming step of forming, on a conductive base material made of a first metal having conductivity, a buffer layer made of a second metal capable of mutual diffusion with the first metal, and forming, on the buffer layer, a catalyst layer made of seed catalyst particles which catalyze formation of carbon nanotubes; a buffer layer diffusion step of performing heat treatment on the laminate; and a carbon nanotube layer forming step of forming the carbon nanotubes on the catalyst layer of the laminate by a chemical vapor deposition method, wherein the heat treatment is performed so as to form a solid phase diffusion region where the first metal and the second metal are solid-phase diffused from a surface of the conductive base material to a predetermined depth selected from depths of 850 nm or more.

8 Claims, 5 Drawing Sheets

METHOD OF MANUFACTURING CARBON NANOTUBE COMPOSITE AND LAMINATE

CROSS REFERENCE TO RELATED APPLICATIONS

This application is based on and claims priority under 35 U.S.C. § 119 to Japanese Patent Application 2017-075260, filed on Apr. 5, 2017, the entire contents of which are incorporated herein by reference.

TECHNICAL FIELD

This disclosure relates to a method of manufacturing a carbon nanotube composite and to a laminate for use in manufacturing the carbon nanotube composite.

BACKGROUND DISCUSSION

Carbon nanotubes have been studied for use in various technical fields because of their unique properties not found in other materials such as graphite and diamond in the related art. For example, carbon nanotubes are studied for use in electrodes of electric storage devices. For example, a carbon nanotube composite in which carbon nanotubes are formed in a laminate can be used as an electrode (especially negative electrode) of an electric storage device such as a lithium ion capacitor.

One of carbon nanotube composites known in the related art is a carbon nanotube composite in which a carbon nanotube array is formed on a "multilayer substrate (laminate) having a structure in which a bonding layer, an interface layer, and a catalyst layer are laminated on an inert support" (refer to Reference 1).

According to the description of JP 2015-530961T (Reference 1), the carbon nanotube composite is manufactured as follows. That is, after a multilayer substrate (laminate in which an iron bonding layer, an aluminum interface layer, and an iron catalyst layer are respectively formed on both sides of an aluminum foil) is annealed at 550° C. under an inert gas flow, carbon source gas is introduced at 550° C. Thereafter, the multilayer substrate is heated to a growth temperature of 630° C., and held at the growth temperature for 5 minutes to grow carbon nanotubes on the multilayer substrate. As described above, the carbon nanotube composite is manufactured.

The multilayer substrate used in the method of manufacturing the carbon nanotube composite described in Reference 1 improves bonding of the aluminum interface layer to the inert support body (aluminum foil) by providing the iron bonding layer.

On the other hand, the inventors of the present application have studied formation of carbon nanotubes in a laminate (laminate not having the iron bonding layer as in Reference 1) in which a catalyst layer including a buffer layer and seed catalyst particles is formed on a conductive base material. Furthermore, in this case, as a result of studying to reduce an introduction temperature of carbon source gas for prevention of aggregation of the seed catalyst particles, the followings have been found.

If the introduction temperature of the carbon source gas is reduced, the growth of the carbon nanotubes occurs when the bonding between the buffer layer and the conductive base material is poor. Therefore, it has been found that the buffer layer peels off from the conductive base material due to interface stress generated at an interface between the buffer layer and the conductive base material when the carbon nanotubes grow. Specifically, it has been found that the buffer layer peels off from the conductive base material due to an increase in interface stress caused by a difference in thermal expansion between the buffer layer and the conductive base material and an increase in interface stress caused by pulling of the buffer layer in a growth direction of the carbon nanotubes as the carbon nanotubes grow. This case is not desirable because, in the carbon nanotube composite, a region is formed in which a surface of the conductive base material is exposed with no carbon nanotubes formed thereon.

Thus, a need exists for a method of manufacturing a carbon nanotube composite and a laminate for use in the manufacturing method, which are not susceptible to the drawback mentioned above.

SUMMARY

A method of manufacturing a carbon nanotube composite according to an aspect of this disclosure (hereinafter sometimes referred to as the "manufacturing method according to an aspect of this disclosure") includes: a laminate forming step of forming, on a conductive base material made of a first metal having conductivity, a buffer layer made of a second metal capable of mutual diffusion with the first metal and forming, on the buffer layer, a catalyst layer made of seed catalyst particles which catalyze formation of carbon nanotubes; a buffer layer diffusion step of performing heat treatment on the laminate; and a carbon nanotube layer forming step of forming the carbon nanotubes on the catalyst layer of the laminate by a chemical vapor deposition method, in which the buffer layer diffusion step is a step of performing the heat treatment so as to form a solid phase diffusion region where the first metal and the second metal are solid-phase diffused from a surface of the conductive base material to a predetermined depth selected from depths of 850 nm or more.

A laminate according to another aspect of this disclosure (hereinafter sometimes referred to as the "laminate according to another aspect of this disclosure") includes: a conductive base material made of a first metal having conductivity; a buffer layer that is on the conductive base material and made of a second metal capable of mutual diffusion with the first metal; a catalyst layer that is on the buffer layer and made of seed catalyst particles which catalyze formation of carbon nanotubes; and a solid phase diffusion region where the first metal and the second metal are solid-phase diffused from a surface of the conductive base material to a predetermined depth selected from depths of 850 nm or more.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a carbon nanotube composite according to an embodiment disclosed here will be described with reference to the drawings. The carbon nanotube composite according to the embodiment disclosed here can be suitably used for an electrode (for example, negative electrode or the like) of an electricity storage device (for example, lithium ion capacitor or the like).

Figure 1A:
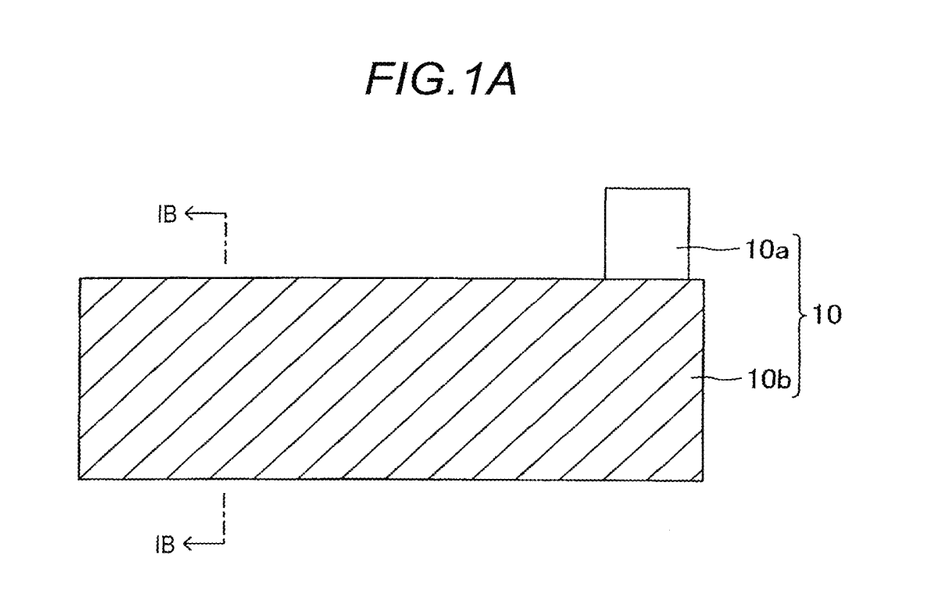
FIG. 1A is a plan view illustrating a configuration example of a carbon nanotube composite according to an embodiment disclosed here.
Figure 1B:
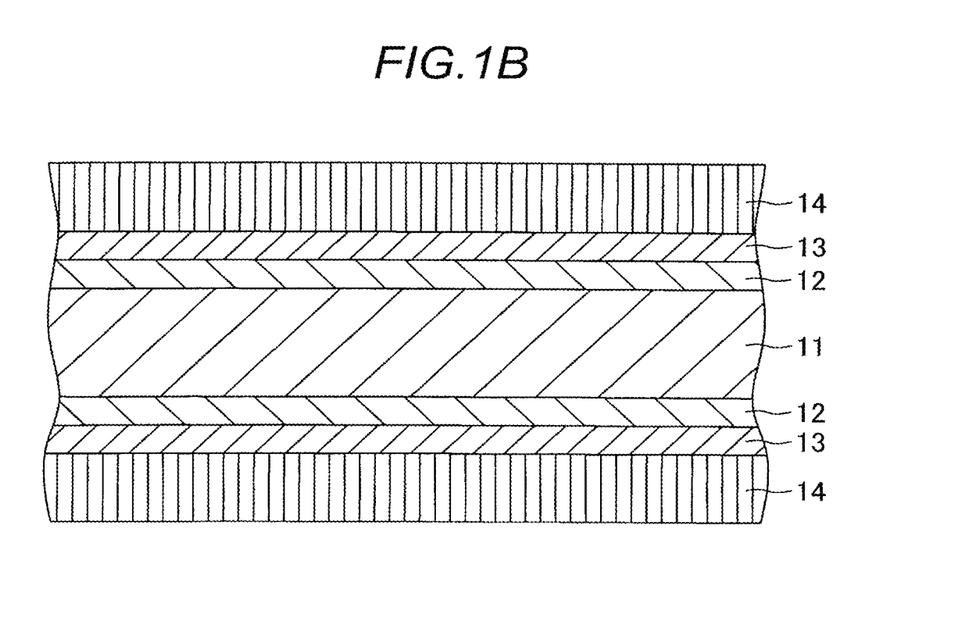
FIG. 1B is a schematic cross-sectional view taken along line IB-IB of FIG. 1A.
Figure 2A:
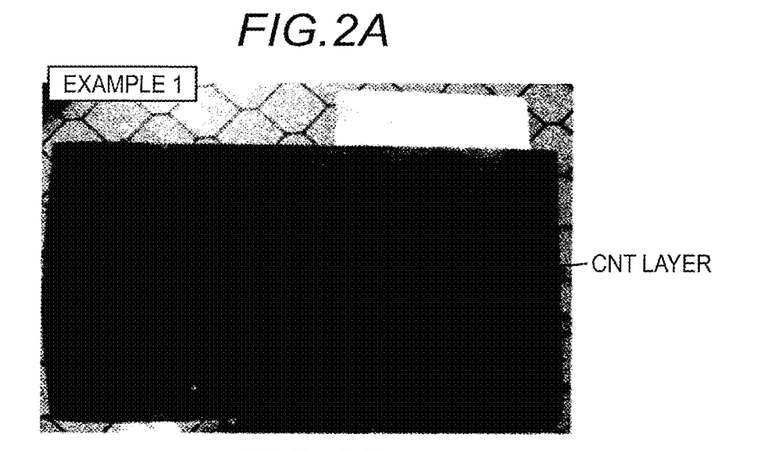
FIG. 2A is a photograph showing an appearance of a carbon nanotube composite of Example 1.
Figure 2B:
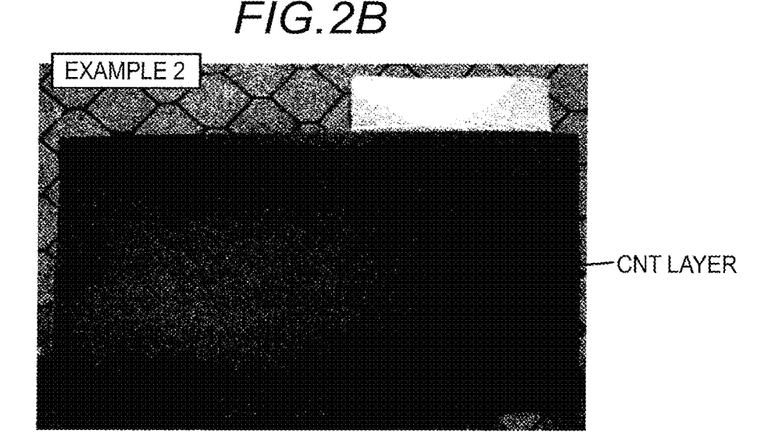
FIG. 2B is a photograph showing an appearance of a carbon nanotube composite of Example 2.
Figure 2C:
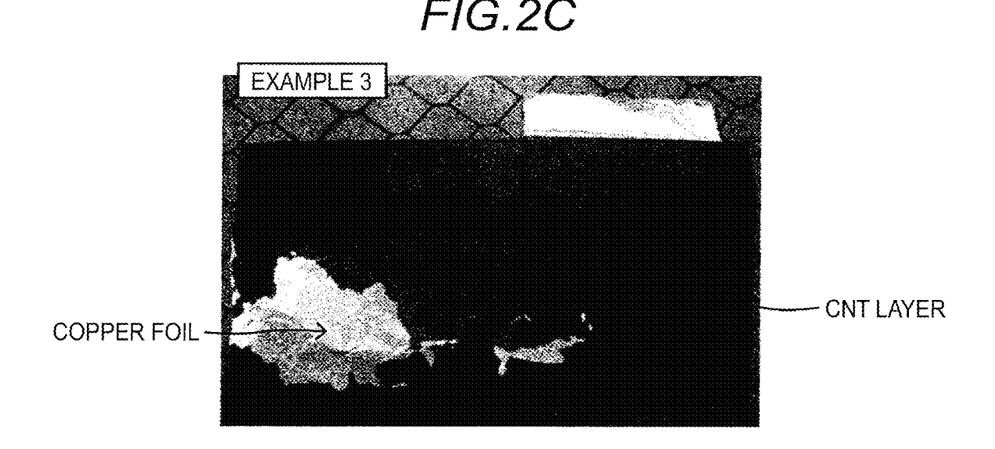
FIG. 2C is a photograph showing an appearance of a carbon nanotube composite of Example 3.
Figure 3A:
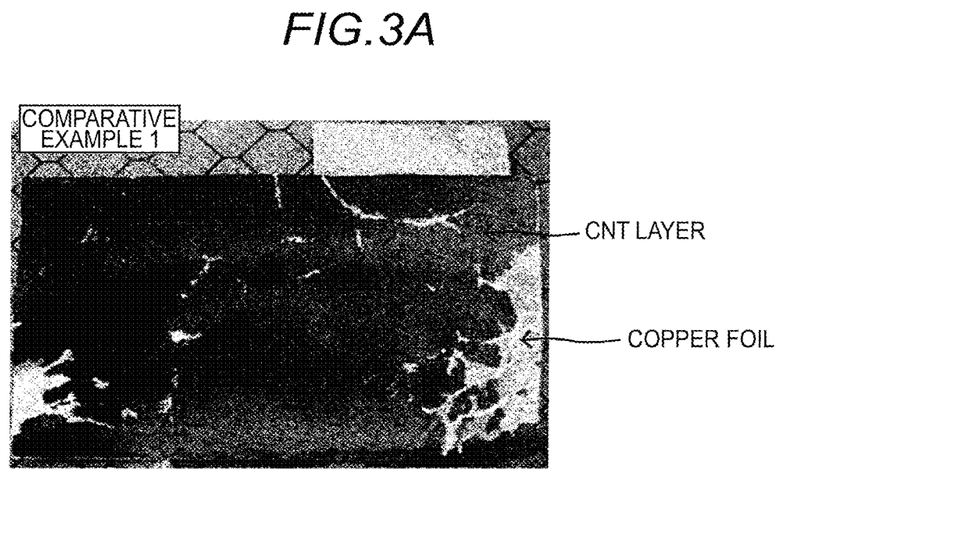
FIG. 3A is a photograph showing an appearance of a carbon nanotube composite of Comparative Example 1.
Figure 3B:
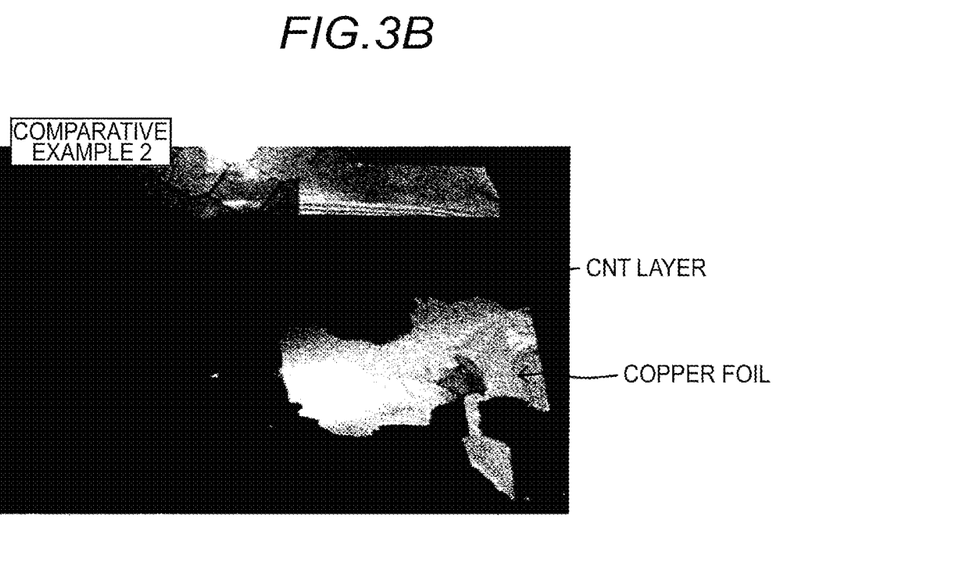
FIG. 3B is a photograph showing an appearance of a carbon nanotube composite of Comparative Example 2.
Figure 4A:
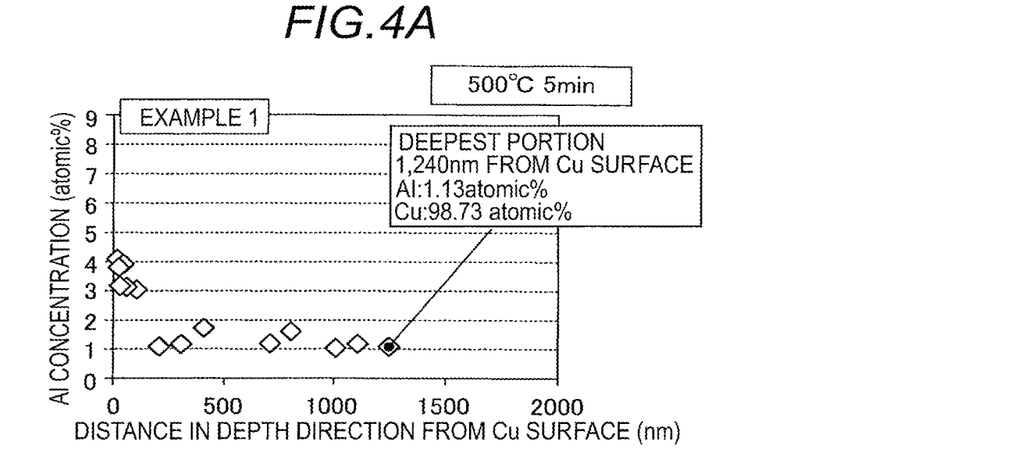
FIG. 4A is a graph illustrating a result of cross-sectional analysis of the laminate of Example 1.
Figure 4B:
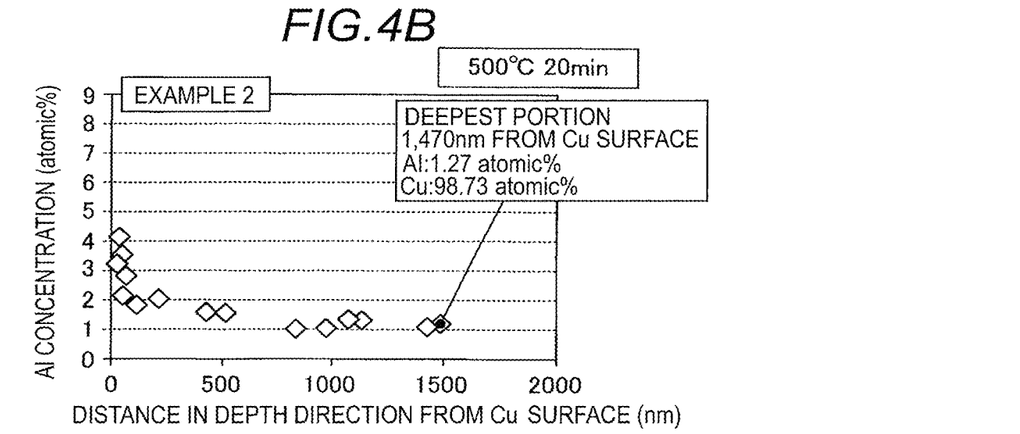
FIG. 4B is a graph illustrating a result of cross-section analysis of the laminate of Example 2.
Figure 4C:
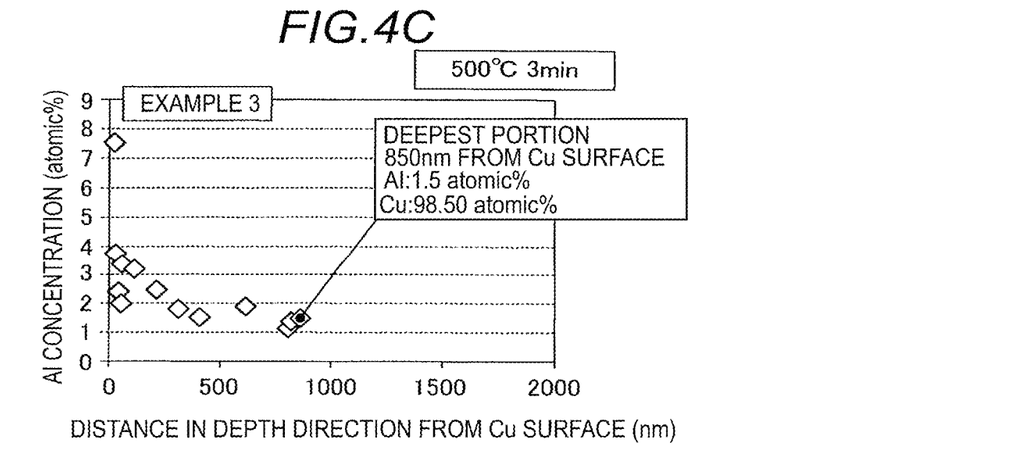
FIG. 4C is a graph illustrating a result of cross-sectional analysis of the laminate of Example 3.
Figure 5A:
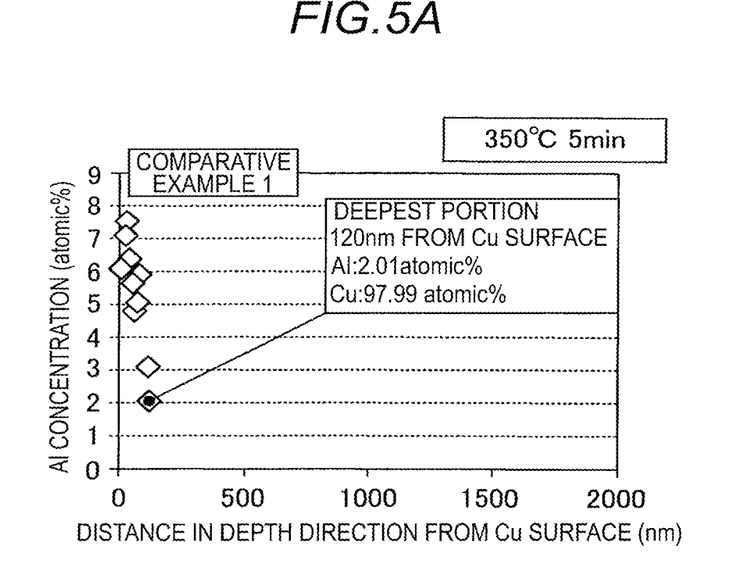
FIG. 5A is a graph illustrating a result of cross-sectional analysis of the laminate of Comparative Example 1.
Figure 5B:
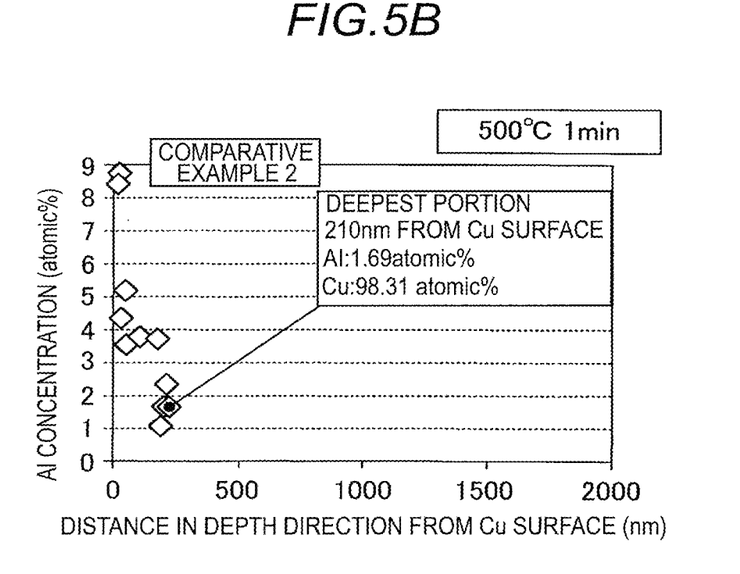
FIG. 5B is a graph illustrating a result of cross-sectional analysis of the laminate of Comparative Example 2.

FIG. 1A and FIG. 1B illustrate a configuration example in which the carbon nanotube composite is used for an electrode. As illustrated in FIG. 1A, an electrode 10 has a terminal portion 10a and an electrode portion 10b. The terminal portion 10a is made of an exposed portion where a carbon nanotube layer 14 (hereinafter referred to as "CNT layer 14") is not formed so that a conductive base material 11 is exposed, and is provided to take out an electric current to outside.

The electrode portion 10b has, for example, a rectangular planar shape and is made of a carbon nanotube composite. As illustrated in FIG. 1B, the carbon nanotube composite constituting the electrode portion 10b includes a buffer layer 12, a catalyst layer 13, and the CNT layer 14 on one main surface and the other main surface of the conductive base material 11, respectively. Although not illustrated, the carbon nanotube composite may have the buffer layer 12, the catalyst layer 13, and the CNT layer 14 on only one main surface of the conductive base material 11.

Conductive Base Material

The conductive base material 11 is made of a first metal having conductivity, and is, for example, a foil-like first metal (first metal foil). As the first metal, for example, copper (Cu) or the like suitable for an electrode (current collector) of a lithium ion capacitor is preferably used. Although not illustrated, a second metal constituting the buffer layer 12 is solid-phase diffused in the conductive base material 11.

If the seed catalyst is formed directly on the conductive base material 11, the catalytic activity may be lost, and thus the buffer layer 12 is provided in order to avoid this problem. The buffer layer 12 is made of a second metal serving as a material which prevents mutual diffusion between the seed catalyst and the conductive base material 11 and functions as an under layer which does not lose the catalytic activity of the seed catalyst, and capable of mutual diffusion with the first metal, and is, for example, a thin film-like second metal (second metal film). A thin film typically refers to a material having a thickness of, for example, several pm or less and having a remarkably small volume as compared with a surface area. Typically, the thickness of the buffer layer 12 is preferably 100 nm or less, and more preferably 50 nm or less, from the viewpoint of better growth of carbon nanotubes.

As the second metal, for example, aluminum (Al) or an alloy containing aluminum (these are collectively referred to as "metal including aluminum"), titanium (Ti) or the like can be used, and aluminum is preferably used.

The catalyst layer 13 is made of a seed catalyst for forming the carbon nanotubes, and is made of, for example, a material (for example, transition metal particles or the like) supported on the buffer layer 12 and capable of catalyzing the formation of the carbon nanotubes. As the material constituting the catalyst layer 13, for example, Fe-based seed catalyst particles such as iron (Fe) or iron-titanium alloy (FeTi) particles, cobalt (Co) particles, nickel (Ni) particles, or the like can be used.

For the seed catalyst particles, particles (nanoparticles) having a primary particle size of nano size can be typically used. The nano size is typically referred to as a size of approximately several nm or more and several tens of nm or less. A material having a nano size is named with the prefix "nano", such as, nanoparticles. The seed catalyst particles preferably have an average primary particle size of 20 nm or less from the viewpoint of better growth of carbon nanotubes.

The CNT layer 14 is made of carbon nanotubes formed on the catalyst layer 13. Specifically, the CNT layer 14 is made of, for example, oriented carbon nanotubes grown from the seed catalyst particles (catalyst layer 13) supported on the buffer layer 12.

Method of Manufacturing Carbon Nanotube Composite

Next, a method of manufacturing a carbon nanotube composite (electrode portion 10b) according to the embodiment disclosed above will be described. The carbon nanotube composite described above is manufactured, for example, as follows. That is, first, a conductive base material 11 is prepared. Next, a buffer layer 12 and a catalyst layer 13 in this order are formed on each of one main surface and the other main surface of the conductive base material 11, so that a laminate is obtained in which the buffer layer 12 and the catalyst layer 13 are formed on each of the one main surface and the other main surface of the conductive base material 11.

Next, in order to solid-phase diffuse (mutual diffuse) the second metal constituting the buffer layer 12 to the first metal constituting the conductive base material 11, a buffer layer diffusion step of performing heat treatment is performed on the laminate. As a result, the laminate for use in manufacturing the carbon nanotube composite disclosed here is obtained.

Next, a CNT layer forming step of forming carbon nanotubes on the catalyst layer 13 of the laminate by a chemical vapor deposition (CVD) method is performed. As a result, the carbon nanotube composite (electrode portion 10b) illustrated in FIGS. 1A and 1B can be obtained.

Hereinafter, details of each step will be described. Hereinafter, an example will be described in which a copper foil is used as the conductive base material 11 and an aluminum thin film (hereinafter referred to as "aluminum film") is used as the buffer layer 12.

Buffer Layer Forming Step

First, for example, as a conductive base material 11, a copper foil having a planar shape in which one side of a rectangle has a projection portion is prepared. Next, an aluminum film is formed as a buffer layer 12 on the copper foil by a well-known thin film forming method (for example, sputtering method).

Catalyst Layer Forming Step

Next, a catalyst layer 13 is formed on the aluminum film by depositing the seed catalyst particles for forming the carbon nanotubes by, for example, a dip coating method. Specifically, first, a catalyst mixed solution containing the seed catalyst particles is prepared. Next, the copper foil having the aluminum film formed thereon is immersed in the catalyst mixed solution using a dip coater (dip coating device), and thereafter the copper foil having the aluminum film formed thereon is pulled up from the catalyst mixed solution at a constant rate. As a result, the seed catalyst particles are supported on the aluminum film, and a laminate having the aluminum film and the seed catalyst particles supported on the aluminum film on each of the one main surface and the other main surface of the copper foil is obtained.

Buffer Layer Diffusion Step

Next, heat treatment is performed on the laminate, so that aluminum (second metal) constituting the aluminum film is solid-phase diffused into the copper foil (first metal). As a result, the laminate for use in manufacturing the carbon nanotube composite disclosed here is obtained.

Specifically, the laminate is placed in, for example, a chamber of a CVD apparatus, a carrier gas (inert gas such as nitrogen gas) is introduced into the chamber, and heat treatment is performed including raising the temperature to a predetermined temperature range in the inert gas atmosphere such as a nitrogen gas atmosphere and holding it for a predetermined holding time within a predetermined temperature range. More specifically, for example, after raising the temperature of the laminate from a room temperature lower than a predetermined holding temperature to a predetermined holding temperature selected from the above-described predetermined temperature range, heat treatment including holding the predetermined holding temperature for a predetermined holding time is performed. As long as the temperature is within the predetermined temperature range after raised to the predetermined holding temperature selected from the above-described predetermined temperature range, the heat treatment is not limited to holding the predetermined holding temperature constant, and may include raising or decreasing the temperature from the predetermined holding temperature, and in the heat treatment, at least one of holding the temperature constant, raising the temperature, and decreasing the temperature may be performed once or more after the temperature is raised or decreased.

As a result, a laminate is obtained in which a region (hereinafter referred to as "solid phase diffusion region") where the aluminum (second metal) is solid-phase diffused in the copper foil (first metal) is formed from the "surface of the copper foil (interface between copper foil and aluminum)" to a "predetermined depth selected from depths of 850 nm or more". The solid phase diffusion region contains 1 atomic % or more of the aluminum (second metal).

By forming such a solid phase diffusion region, the bonding at the interface between the copper foil (conductive base material 11) and the aluminum film (buffer layer 12) can be improved. As a result, peeling between the copper foil and the aluminum film can be prevented when carbon nanotubes are formed by introducing a carbon source gas at a low temperature (for example, at 500° C.), so that in the carbon nanotube composite, it is possible to prevent the occurrence of a region where the surface of the copper foil is exposed with no carbon nanotubes formed thereon.

When the heat treatment described above is performed, the predetermined temperature range and the predetermined temperature time are appropriately set to provide such conditions that the solid phase diffusion region where the first metal and the second metal are solid-phase diffused from the surface of the conductive base material 11 to a predetermined depth selected from depths of 850 nm or more can be formed.

Typically, the predetermined temperature range is preferably 500° C. or higher from the viewpoint of improving the bonding at the interface between the copper foil (conductive base material 11) and the aluminum film (buffer layer 12). Furthermore, from the viewpoint that the aggregation of the seed catalyst particles can be prevented and a basis weight of the carbon nanotubes (that is, mass ($mg/cm^2$) of carbon nanotubes per unit area) can be increased, it is preferably in a temperature range of 500° C. or higher and lower than 700° C., more preferably in a temperature range of 500° C. or higher and 600° C. or lower, and more preferably in a temperature range of 500° C. or higher and lower than 550° C.

In a case where the predetermined temperature range is in the temperature range of 500° C. or higher and lower than 700° C., the bonding at the interface between the copper foil (conductive base material 11) and the aluminum film (buffer layer 12) can be improved, and the seed catalyst particles can be prevented from aggregating and becoming too coarse.

It is generally known that the growth property of carbon nanotubes deteriorates when seed catalyst particles aggregate and become too coarse (note that in a state where carbon nanotubes grow to some extent on seed catalyst particles, aggregation of the seed catalyst particles can be prevented). Accordingly, when the predetermined temperature range is within the above temperature range, it is possible to prevent the growth of the carbon nanotubes from being inhibited by the aggregation of the seed catalyst particles.

For example, when the predetermined holding temperature selected from the predetermined holding temperature range is 500° C., the predetermined holding time is preferably more than 1 minute from the viewpoint of improving the bonding of the interface between the copper foil (conductive base material 11) and the aluminum film (buffer layer 12). The lower limit value of the predetermined holding time tends to become shorter as the predetermined holding temperature (predetermined holding temperature range) increases, and the lower limit value of the predetermined holding time tends to become longer as the prescribed holding temperature decreases.

CNT Layer Forming Step

Next, the carbon nanotubes are produced on the surface of the catalyst layer by a CVD method (for example, thermal CVD method or the like), which is performed on the laminate placed in the chamber of a CVD apparatus (CVD furnace). In this case, first, a carrier gas and a reactive gas (carbon source gas such as a hydrocarbon gas such as acetylene or the like) are introduced into the chamber, and the atmosphere in the chamber is heated at the same time as introducing the gas, so that the surface of the aluminum film is raised from the introduction temperature of the carbon source gas to the carbon nanotube synthesis temperature (typically, temperature in a range of 500° C. or higher and 900° C. or lower). The carbon nanotube synthesis temperature is held until the carbon nanotubes are produced.

Typically, the introduction temperature of the carbon source gas is the same as the temperature at the end of the heat treatment in the buffer layer diffusion step. For example, when the temperature in the heat treatment is raised to the predetermined holding temperature selected from the predetermined temperature range and held at the predetermined holding temperature for the predetermined holding time, the introduction temperature of the carbon source gas is the same as the predetermined holding temperature at the end of the heat treatment.

The introduction temperature of the carbon source gas may be set to any temperature as long as the introduction temperature is within the synthesis temperature range of the carbon nanotubes, but if the temperature is high, the seed catalyst particles constituting the catalyst layer 13 for the carbon nanotubes may aggregate and the particle diameter may tend to become too coarse. If the particle diameter becomes too coarse, the growth property of the carbon nanotubes may tend to decrease. Accordingly, the temperature is preferably lower than 700° C., and more preferably lower than 550° C.

The carbon source gas supplied into the chamber is thermally decomposed on the catalyst surface. Carbon is produced by the thermal decomposition reaction of the carbon source gas, and the produced carbon forms a carbon coating on the surface of the aluminum film. In this case, the carbon formed on the surface of the aluminum film forms a solid solution with the seed catalyst (seed catalyst particles) supported on the surface of the aluminum film. When the concentration of carbon forming the solid solution with the seed catalyst rises to a predetermined concentration or higher, carbon nanotubes are precipitated from the seed catalyst. By growing the precipitated carbon nanotubes from the seed catalyst, oriented carbon nanotubes are grown from the catalyst layer 13 and formed (that is, the CNT layer 14 is formed on the catalyst layer 13). As a result, the carbon nanotube composite illustrated in FIGS. 1A and 1B is manufactured.

EXAMPLES

Hereinafter, this disclosure will be specifically described with reference to examples, and this disclosure is not limited to only these examples.

Example 1

As illustrated in FIGS. 1A and 1B, a carbon nanotube composite of Example 1 was prepared by forming a buffer layer 12 (aluminum film), a catalyst layer 13 (FeTi seed catalyst particles), and a CNT layer 14 in a rectangular shape on one main surface and the other main surface of a copper foil cut into a planar form having a rectangular shape, one side of which had a protrusion portion.

First, the following "aluminum film forming step" and "catalyst layer forming step" were sequentially performed to obtain a laminate in which an aluminum film and a catalyst layer were formed in this order on the copper foil.

Aluminum Film Forming Step

An aluminum film (thickness: 50 nm) was formed on each of the one main surface and the other main surface of the copper foil by a sputtering method.

Catalyst Layer Forming Step

Next, a catalyst layer was formed by depositing FeTi (iron-titanium alloy) seed catalyst particles (average particle diameter 5 nm) on the aluminum film. First, the copper foil having the aluminum film formed thereon was immersed in a coating solution using a dip coater. The coating solution was prepared by dispersing the FeTi seed catalyst particles in heptane. Next, the copper foil having the aluminum film formed thereon was pulled out from the coating solution. As a result, a laminate was obtained in which a catalyst layer (thickness: 20 nm) made of the FeTi seed catalyst supported on the surface of the aluminum film on the copper foil was formed. That is, a laminate was obtained in which the FeTi seed catalyst particles were supported on the surface of the aluminum film.

Buffer Layer Diffusion Step

Next, the laminate was set at a predetermined position in the chamber of a CVD apparatus, and thereafter the lid was closed and evacuation was performed up to 10 Pa. Next, 5 SLM of nitrogen gas was introduced as a carrier gas into the chamber of the CVD apparatus, and the pressure was adjusted to 90 kPa.

Thereafter, the atmosphere in the chamber was heated so that the temperature was raised until the temperature (surface temperature) of the laminate reached 500° C. (holding temperature) from the room temperature at a rate of temperature rise of 1.5° C./min, and after the temperature of the laminate reached 500° C., the laminate was held at the same temperature for 5 minutes (holding time).

CNT Layer (Carbon Nanotubes) Forming Step

After the temperature holding was completed, acetylene gas ($C_2H_2$ gas) and carrier gas (nitrogen gas) were introduced into the chamber at the temperature (500° C. (introduction temperature of carbon source gas)) at $C_2H_2$ gas: carrier gas=4.0 SLM: 17 SLM. Simultaneously with the introduction of the gas, the atmosphere inside the chamber was heated so that the temperature was raised until the temperature of the laminate reached 850° C. from 500° C. at a rate of temperature rise of 1.5° C./min.

Thereafter, the laminate was held at the same temperature for 2,300 seconds after the temperature of the laminate reached 850° C., so that carbon nanotubes were grown from the seed catalyst particles on the surface of the aluminum film of the laminate and formed. As a result, the carbon nanotube composite of Example 1 was prepared.

Example 2

A carbon nanotube composite of Example 2 was prepared in the same manner as in Example 1 except that the holding time of the heat treatment in the buffer layer diffusion step was changed to 20 minutes.

Example 3

A carbon nanotube composite of Example 3 was prepared in the same manner as in Example 1 except that the holding time of the heat treatment in the buffer layer diffusion step was changed to 3 minutes.

Example 4

A carbon nanotube composite of Example 4 was prepared in the same manner as in Example 1 except that the holding temperature of the heat treatment in the buffer layer diffusion step was changed to 700° C.

Comparative Example 1

A carbon nanotube composite of Comparative Example 1 was prepared in the same manner as in Example 1 except that the holding temperature of the heat treatment in the buffer layer diffusion step was changed to 350° C.

Comparative Example 2

A carbon nanotube composite of Comparative Example 2 was prepared in the same manner as in Example 1 except that the holding time of the heat treatment in the buffer layer diffusion step was changed to 1 minutes.

Comparative Example 3

A carbon nanotube composite of Comparative Example 3 was prepared in the same manner as in Example 1 except that the holding temperature of the heat treatment in the buffer layer diffusion step was changed to 400° C.

Comparative Example 4

A carbon nanotube composite of Comparative Example 4 was prepared in the same manner as in Comparative Example 1 except that the holding time of the heat treatment in the buffer layer diffusion step was changed to 20 minutes.

Evaluation

Checking for Peeling (Evaluation of Bonding)

Regarding each of the prepared carbon nanotube composites of Examples 1 to 4 and Comparative Examples 1 to 4, measurements were performed for the area and rate of peeling of the CNT layer to evaluate the bonding between the aluminum film (buffer layer) and the copper foil (conductive base material).

Specifically, the area S1 in the plan view (total on both sides) of the peeling region of the CNT layer (region where the CNT layer was not formed so that the copper foil was exposed (excluding terminal portion)) was measured, and the ratio (=(S1/S2)×100) (%) of the area in the plan view (total on both sides) of the peeling region of the CNT layer to the total area S2 (total on both sides) in the plan view of the region where the CNT layer formation was performed was further obtained. It was evaluated based on the following evaluation criteria. The evaluation results are illustrated in Table 1.

Peeling ratio 0% (no peeling): A
Peeling ratio 10% or less: B
Peeling ratio more than 10%: C The peeling ratio was evaluated based on 10% as a reference value. This reference value is a value determined based on the final weight variation which is typically required to be 10% or less in manufacturing the electrode of a lithium ion capacitor.

Regarding Examples 1 to 3 and Comparative Example 1 and Comparative Example 2, photographs are shown in FIGS. 2A to 2C and FIGS. 3A and 3B in which the state of the CNT layer of the carbon nanotube composite is observable.

Measurement of Aluminum Diffusion Distance

Regarding each of Example 1, Example 2, Example 4, Comparative Example 1, and Comparative Example 2, the laminate (copper foil with the catalyst layer and the aluminum film formed) obtained immediately after the buffer layer diffusion step was taken out of the chamber of the CVD apparatus, and sectioned by ion milling method.

Thereafter, cross section analysis and observation was performed by scanning electron microscope/energy dispersive x-ray spectroscopy (SEM/EDX). That is, point analysis was performed in the depth direction of the surface of the copper foil.

The atomic concentration (atomic %) of aluminum at the place where aluminum was detected and the distance in the depth direction from the surface of copper foil (interface between copper foil and catalyst particles) were plotted in the graph (vertical axis: Al concentration (atomic %), horizontal axis: distance in the depth direction (nm) from the surface of the copper foil). The graphs are illustrated in FIGS. 4A to 4C, and FIGS. 5A and 5B. Furthermore, Table 1 illustrates the Al diffusion distance (that is, the deepest portion of the region where Al is present at 1.0 atomic % or more (that is, the depth of the solid phase diffusion region)).

Measurement of Basis Weight

Regarding each of the prepared carbon nanotube composites of Example 1, Example 2, and Example 4, the basis weight of the CNT layer was measured. The measurement results are illustrated in Table 1.

TABLE 1

|  | Buffer layer diffusion step | | Evaluation of peeling | | | Basis weight [mg/cm$^2$] | Al diffusion distance (depth of solid phase diffusion region) [nm] |
| --- | --- | --- | --- | --- | --- | --- | --- |
|  | Holding temperature | Holding time | Peeling ratio [%] | Peeled area [cm$^2$] | Evaluation |  |  |
| Example 1 | 500° C. | 5 minutes | 0 (no peeling) | 0 (no peeling) | A | 4.8 | 1,240 |
| Example 2 | 500° C. | 20 minutes | 0 (no peeling) | 0 (no peeling) | A | 5.1 | 1,470 |
| Example 3 | 500° C. | 3 minutes | 10 | 20 | B | Unmeasured | 850 |
| Example 4 | 700° C. | 5 minutes | 0 (no peeling) | 0 (no peeling) | A | 2.1 | Unmeasured |
| Comparative Example 1 | 350° C. | 5 minutes | 60 | 102 | C | Unmeasured | 120 |
| Comparative Example 2 | 500° C. | 1 minutes | 30 | 51 | C | Unmeasured | 210 |
| Comparative Example 3 | 400° C. | 5 minutes | 60 | 102 | C | Unmeasured | Unmeasured |
| Comparative Example 4 | 350° C. | 20 minutes | 40 | 68 | C | Unmeasured | Unmeasured |

As illustrated in Table 1, the peeling evaluation result was better in Examples 1 to 4 than in Comparative Examples 1 to 4. That is, from Examples 1 to 4, it has been found that the bonding between the aluminum film and the copper foil can be improved because the Al diffusion distance of the laminate is 850 nm or more. Although the Al diffusion distance is not measured in Example 4, it can be easily expected that the Al diffusion distance of Example 4 is at least larger than the diffusion distance (1,240 nm) of Example 1, because the holding temperature (700° C.) is higher than the holding temperature (500° C.) of Example 1 with the same holding time (5 minutes). In Example 4, since the holding temperature is higher than those in Examples 1 to 3, the seed catalyst particles are coarsened due to the aggregation of the seed catalyst particles, so that the growth property of the carbon nanotubes tends to be lower than that in Examples 1 to 3, and the basis weight tends to be lower than that in Examples 1 to 3. Furthermore, it is suggested that when the holding temperature exceeds 700° C., the seed catalyst particles may be coarse due to the aggregation of the seed catalyst particles, so that the growth property of the carbon nanotubes may further decrease and the basis weight may further decrease.

Modification Examples

Although embodiments and examples of this disclosure have been specifically described above, this disclosure is not limited to the above-described embodiments and examples, and various modifications based on the technical idea disclosed here are possible.

For example, the configurations, methods, steps, shapes, materials, numerical values, and the like shown in the above embodiments and examples are only by way of example, and if necessary, different configurations, methods, steps, shapes, materials, numerical values, and the like may be used.

In addition, the configurations, methods, steps, shapes, materials, numerical values, and the like of the above-described embodiments and examples can be combined with each other without departing from the gist of this disclosure.

The manufacturing method according to an aspect of this disclosure includes: a laminate forming step of forming, on a conductive base material made of a first metal having conductivity, a buffer layer made of a second metal capable of mutual diffusion with the first metal and forming, on the buffer layer, a catalyst layer made of seed catalyst particles which catalyze formation of carbon nanotubes; a buffer layer diffusion step of performing heat treatment on the laminate; and a carbon nanotube layer forming step of forming the carbon nanotubes on the catalyst layer of the laminate by a chemical vapor deposition method, in which the buffer layer diffusion step is a step of performing the heat treatment so as to form a solid phase diffusion region where the first metal and the second metal are solid-phase diffused from a surface of the conductive base material to a predetermined depth selected from depths of 850 nm or more.

In the manufacturing method according to an aspect of this disclose, the second metal in the solid phase diffusion region may have a concentration of 1 atomic % or more.

In the manufacturing method according to an aspect of this disclose, the heat treatment may include raising a temperature of the laminate to a predetermined temperature range of 500° C. or higher and then holding the laminate at the predetermined temperature range of 500° C. or higher for a predetermined holding time.

In the manufacturing method according to an aspect of this disclose, the heat treatment may include raising the temperature of the laminate to a predetermined holding temperature selected from predetermined temperature ranges of 500° C. or higher and then holding the laminate at the predetermined holding temperature for more than 1 minute.

In the manufacturing method according to an aspect of this disclose, the predetermined temperature ranges may be 500° C. or higher and lower than 700° C.

In the manufacturing method according to an aspect of this disclose, the first metal may be copper, and the second metal may be a metal including aluminum.

The laminate according to another aspect of this disclosure includes: a conductive base material made of a first metal having conductivity; a buffer layer that is on the conductive base material and made of a second metal capable of mutual diffusion with the first metal; a catalyst layer that is on the buffer layer and made of seed catalyst particles which catalyze formation of carbon nanotubes; and a solid phase diffusion region where the first metal and the second metal are solid-phase diffused from a surface of the conductive base material to a predetermined depth selected from depths of 850 nm or more.

In the laminate according to another aspect of this disclose, the second metal in the solid phase diffusion region may have a concentration of 1 atomic % or more.

In the laminate according to another aspect of this disclose, the first metal may be copper, and the second metal may be a metal including aluminum.

According to this disclosure, when carbon nanotubes are formed on the laminate by a chemical vapor deposition method, the bonding between the conductive base material and the buffer layer on the conductive base material can be improved. As a result, the buffer layer can be prevented from peeling from the conductive base material when the carbon nanotubes are formed, so that in the carbon nanotube composite, it is possible to prevent the occurrence of a region where the surface of the conductive base material is exposed with no carbon nanotubes formed thereon.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method of manufacturing a carbon nanotube composite, comprising:
    a laminate forming step of forming, on a conductive base material made of a first metal having conductivity, a buffer layer made of a second metal capable of mutual diffusion with the first metal, and forming, on the buffer layer, a catalyst layer made of seed catalyst particles which catalyze formation of carbon nanotubes;
    a buffer layer diffusion step of performing heat treatment on the laminate to raise the temperature of the laminate to predetermined temperature range of 500° C. or higher and then holding the laminate at the predetermined temperature range of 500° C. or higher for a predetermined holding time; and
    a carbon nanotube layer forming step of forming the carbon nanotubes on the catalyst layer of the laminate by a chemical vapor deposition method,
    wherein the buffer layer diffusion step is a step of performing the heat treatment under inert gas introduction so as to form a solid phase diffusion region where the first metal and the second metal are solid-phase diffused from a surface of the conductive base material to a predetermined depth selected from depths of 850 nm or more.

2. The method of manufacturing a carbon nanotube composite according to claim 1,
    wherein a concentration of the second metal in the solid phase diffusion region is 1 atomic° or more.

3. The method of manufacturing a carbon nanotube composite according to claim 1,
   wherein the predetermined holding time is more than 1 minute.

4. The method of manufacturing a carbon nanotube composite according to claim 1,
   wherein the predetermined temperature range is from 500° C. to 700° C.

5. The method of manufacturing a carbon nanotube composite according to claim 1,
   wherein the first metal is copper, and
   the second metal is a metal including aluminum.

6. A laminate comprising:
   a conductive base material made of a first metal having conductivity;
   a buffer layer that is on the conductive base material and made of a second metal capable of mutual diffusion with the first metal;
   a catalyst layer that is on the buffer layer and made of seed catalyst particles which catalyze formation of carbon nanotubes; and
   a solid phase diffusion region where the first metal and the second metal are solid-phase diffused from a surface of the conductive base material to a predetermined depth selected from depths of 850 nm or more.

7. The laminate according to claim 6,
   wherein a concentration of the second metal in the solid phase diffusion region is 1 atomic% or more.

8. The laminate according to claim 6,
   wherein the first metal is copper, and
   the second metal is a metal including aluminum.

* * * * *